(12) United States Patent
Enomoto et al.

(10) Patent No.: US 10,266,027 B2
(45) Date of Patent: Apr. 23, 2019

(54) SUSPENSION COIL SPRING

(71) Applicant: NHK SPRING CO., LTD., Yokohama-shi, Kanagawa (JP)

(72) Inventors: Hideto Enomoto, Fujisawa (JP); Jun Umeno, Yokohama (JP); Ken Okura, Yokohama (JP); Shuji Ohmura, Yokohama (JP)

(73) Assignee: NHK SPRING CO., LTD., Tokyo (JP)

( * ) Notice: Subject to any disclaimer, the term of this patent is extended or adjusted under 35 U.S.C. 154(b) by 114 days.

(21) Appl. No.: 15/277,611

(22) Filed: Sep. 27, 2016

(65) Prior Publication Data

US 2017/0015171 A1 Jan. 19, 2017

Related U.S. Application Data

(63) Continuation of application No. PCT/JP2015/051846, filed on Jan. 23, 2015.

(30) Foreign Application Priority Data

Mar. 28, 2014 (JP) .................. 2014-067465

(51) Int. Cl.
*F16F 1/12* (2006.01)
*B60G 11/52* (2006.01)
(Continued)

(52) U.S. Cl.
CPC .............. *B60G 11/52* (2013.01); *B60G 11/14* (2013.01); *B60G 11/16* (2013.01); *B60G 15/068* (2013.01);
(Continued)

(58) Field of Classification Search
CPC .................. F16F 1/024; F16F 1/126
See application file for complete search history.

(56) References Cited

U.S. PATENT DOCUMENTS 7,806,392 B2 * 10/2010 Ishikawa .............. B60G 15/063
267/179
2005/0051937 A1 3/2005 Umezawa et al.
(Continued)

FOREIGN PATENT DOCUMENTS

DE 1979962 U 2/1968
DE 102007003782 A1 7/2008
(Continued)

OTHER PUBLICATIONS

Machine translation of JP 2003-206968, retrieved May 11, 2018 (Year: 2018).*
(Continued)

*Primary Examiner* — Bradley T King
(74) *Attorney, Agent, or Firm* — Holtz, Holtz & Volek PC (57) ABSTRACT

An end turn portion of a coil spring includes a first portion, a second portion, and a third portion. The first portion is always in contact with a spring seat irrespective of the magnitude of a load applied to the coil spring. The second portion contacts the spring seat when the load applied to the coil spring is large, and is separated from the spring seat when the load is small. The third portion is always separated from the spring seat irrespective of the magnitude of the load. An insulating sheet made of a material having rubber elasticity is attached to a lower surface of a wire at the end turn portion by means of adhesive bonding. The insulating sheet is provided on a lower surface of a region including at least the second portion.

9 Claims, 7 Drawing Sheets

(51) Int. Cl.
*B60G 11/16* (2006.01)
*B60G 11/14* (2006.01)
*B60G 15/06* (2006.01)

(52) U.S. Cl.
CPC ............ *F16F 1/126* (2013.01); *B60G 15/063* (2013.01); *B60G 2202/12* (2013.01); *B60G 2204/1242* (2013.01); *B60G 2206/821* (2013.01); *F16F 2226/042* (2013.01)

(56) References Cited

U.S. PATENT DOCUMENTS

| | | | |
|---|---|---|---|
| 2007/0116963 | A1 | 5/2007 | Sakakibara |
| 2007/0176340 | A1 | 8/2007 | Umezawa et al. |
| 2014/0225319 | A1* | 8/2014 | Schussler ............... B60G 11/14 267/179 |

FOREIGN PATENT DOCUMENTS

| | | | |
|---|---|---|---|
| EP | 2697084 | A1 | 2/2014 |
| JP | 57069126 | A | 4/1982 |
| JP | 62071423 | U | 5/1987 |
| JP | 08200414 | A | 8/1996 |
| JP | 2000304079 | A | 10/2000 |
| JP | 2003206968 | A | 7/2003 |
| JP | 2003206969 | A | 7/2003 |
| JP | 2005171297 | A | 6/2005 |
| KR | 101284449 | B1 | 7/2013 |
| WO | 03046406 | A1 | 6/2003 |
| WO | 2012139782 | A1 | 10/2012 |

OTHER PUBLICATIONS

International Search Report (ISR) and Written Opinion dated Mar. 13, 2015 issued in International Application No. PCT/JP2015/051846.
Canadian Office Action dated Feb. 13, 2018 issued in counterpart Canadian Application No. 2,943,644.
International Preliminary Report on Patentability (IPRP) and Written Opinion dated Oct. 13, 2016, issued in International Application No. PCT/JP2015/051846.
Extended European Search Report (EESR) dated Dec. 7, 2017 issued in counterpart European Application No. 15770185.5.
Japanese Office Action dated Dec. 12, 2017 issued in counterpart Japanese Application No. 2014-067465.

* cited by examiner

SUSPENSION COIL SPRING

CROSS-REFERENCE TO RELATED APPLICATIONS

This application is a Continuation Application of PCT Application No. PCT/JP2015/051846, filed Jan. 23, 2015 and based upon and claiming the benefit of priority from prior Japanese Patent Application No. 2014-067465, filed Mar. 28, 2014, the entire contents of all of which are incorporated herein by reference.

BACKGROUND OF THE INVENTION

1. Field of the Invention

The present invention relates to a suspension coil spring which is used in a suspension mechanism of a vehicle such as a car.

2. Description of the Related Art

The suspension mechanism of a vehicle such as a car comprises a suspension coil spring (hereinafter simply referred to as a coil spring) formed of a compression coil spring. Further, the suspension mechanism comprises a lower spring seat and an upper spring seat. The lower spring seat is disposed on the lower side of the coil spring. The upper spring seat is disposed on the upper side of the coil spring. The coil spring is compressed between the upper and lower spring seats by the weight (load) applied from above. Further, the coil spring extends and retracts in accordance with the magnitude of the load.

One of the causes of the breaking of the coil spring is the formation of rust as the coating of the coil spring is detached by thrown-up pebbles. If a corrosion pit is formed as the rust grows, the coil spring breaks from the corrosion pit. Hence, as disclosed in Patent Literature 1 (JP 2005-171297 A), it has been proposed to form a coating film of two-layer structure on the surface of a coil spring. An example of the coating film of two-layer structure is comprised of an epoxy resin based undercoat layer, and an epoxy polyester resin based topcoat layer formed on the undercoat layer.

An end turn portion of the coil spring includes a first portion, a second portion, and a third portion. The first portion is always in contact with the spring seat irrespective of the magnitude of the load. The second portion contacts the spring seat or is separated from the spring seat depending on the magnitude of the load. For this reason, in the second portion, foreign matter such as sand may stick between the end turn portion and the spring seat. The third portion is always separated from the spring seat irrespective of the magnitude of the load. Rust-inhibiting coating is applied to the surface of the coil spring. However, when the coil spring extends and retracts in a state where hard foreign matter such as sand is stuck between the end turn portion and the spring seat, the coating film detaches and rust is formed. Also, because of the sticking foreign matter, the surface of the coil spring may be damaged. When rust forms in the damaged part and the rust grows, it leads to the coil spring breaking.

As described in Patent Literature 2 (JPH08-200414 A), a suspension mechanism comprising means for preventing an end turn portion of a coil spring from wearing is publicly known. This suspension mechanism is provided with an insulator formed of a rubber block on a spring seat. This insulator supports the end turn portion of the coil spring. In a coil spring described in Patent Literature 3 (JP 2000-304079A), at an end turn portion of the coil spring, a tube made of synthetic resin is fitted. In the tube made of synthetic resin, a slit is formed along a longitudinal direction of a wire.

A coil spring of Patent Literature 1 has a coating film of two-layer structure which is constituted by an undercoat layer and a topcoat layer. This type of coil spring is effective against thrown-up pebbles. However, the coil spring has a little effect against corrosion or damage caused by sand, etc., trapped between an end turn portion and a spring seat. Moreover, the coating film of two-layer structure has the problem that the cost to be the incurred by coating is high as compared to a coil spring having a general coating film.

In the suspension mechanism of Patent Literature 2, on the lower spring seat, a block insulator is arranged. Since the insulator is quite heavy, the suspension mechanism has the problem that an unsprung weight becomes large. Moreover, foreign matter such as sand and dust may accumulate on an upper surface of the block insulator. When the foreign matter contacts the end turn portion, the wire is damaged.

In the coil spring of Patent Literature 3, the tube made of synthetic resin having a slit is fitted to the end turn portion. In this type of coil spring, when parts of the wire near the end turn portion come close to each other because of a large load such as in a full bump, the tube mentioned above is sandwiched between the parts of the wire and is compressed. Since the tube produces a repulsive force when this occurs, there is the fear that the load/deflection characteristics of the coil spring may be varied from the design value. Also, when the tube having the slit is fitted to the end turn portion, a corrosive material such as an antifreeze agent scattered on a road in winter enters into the slit. Such a corrosive material being adhered to the wire and remaining on the wire causes the wire to corrode.

BRIEF SUMMARY OF THE INVENTION

Accordingly, an object of the present invention is to provide a suspension coil spring capable of preventing a wire from being broken by wear or damage to the end turn portion.

A suspension coil spring according to the present invention comprises a lower end turn portion formed at a lower end side of a wire which is helically wound, and an upper end turn portion formed at an upper end side of the wire. At least the lower end turn portion comprises a first portion which is always in contact with a lower spring seat irrespective of the magnitude of a load, a second portion which contacts the spring seat or is separated from the same in accordance with the magnitude of the load, and a third portion which is always separated from the spring seat irrespective of the magnitude of the load. Further, at least the second portion of the lower end turn portion is provided with an insulating sheet which is made of a material having rubber elasticity and is attached to a lower surface of the wire by adhesive bonding. The material having rubber elasticity may be, for example, synthetic resin having elasticity such as elastomer, or natural rubber or synthetic rubber.

According to the present invention, the insulating sheet can prevent wear or damage from being caused on the end turn portion by the foreign matter such as sand stuck between the end turn portion of the coil spring and the spring seat. Further, it is possible to prevent the coil spring from breaking by such wear and damage by means of the above-mentioned insulating sheet, and the durability of the coil spring can be improved. It is also possible to integrally form a convex portion for adjusting a force line position on the insulating sheet.

In one embodiment, the insulating sheet is provided in the first portion and the second portion. Also, in one embodiment, a convex portion which protrudes toward the spring seat may be formed on a lower surface of the insulating sheet in at least one place in a winding direction of the end turn portion in order to adjust a force line position. The insulating sheet may be provided in only the second portion. Alternatively, the insulating sheet may be provided in the second portion, a part of the first portion which is connected to the second portion, and a part of the third portion which is connected to the second portion. Further, in these embodiments, a taper portion whose thickness is reduced toward the first portion from the second portion may be formed at an end portion of the insulating sheet. A coating film formed between the wire and the insulating sheet may further be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A suspension coil spring according to a first embodiment will now be described with reference to FIGS. 1 to 5.

Figure 1:
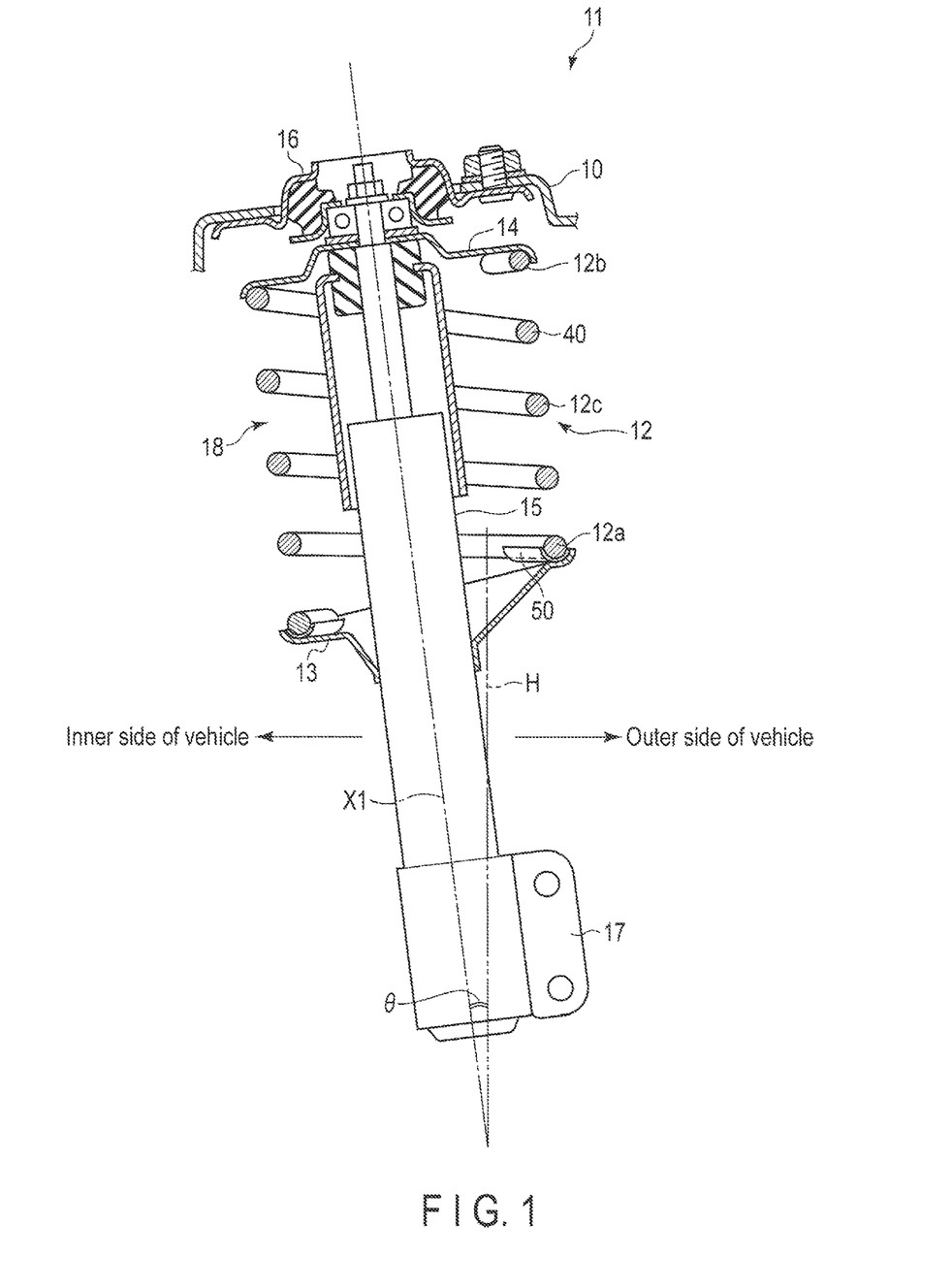
FIG. 1 is a longitudinal sectional view of a suspension mechanism comprising a coil spring according to a first embodiment.

FIG. 1 shows a McPherson-strut-type suspension mechanism 11, which is an example of a suspension mechanism for vehicles. The suspension mechanism 11 is provided on a vehicle body 10. The suspension mechanism 11 comprises a coil spring (a compression coil spring) 12, a lower spring seat 13, an upper-spring seat 14, a shock absorber 15, a mount member 16, and a bracket 17. The lower spring seat 13 is disposed on the lower side of the coil spring 12. The upper spring seat 14 is disposed on the upper side of the coil spring 12. An upper end of the shock absorber 15 is mounted on the vehicle body 10 by the mount member 16. A knuckle member which supports a wheel axis is mounted on the bracket 17.

The coil spring 12 is arranged in such a state that it is compressed between the lower spring seat 13 and the upper spring seat 14. A spring apparatus 18 is constituted by the coil spring 12 and the spring seats 13 and 14. The shock absorber 15 is mounted on the vehicle body 10 in such a position that axis X1 is inclined by angle θ with respect to vertical line H extending vertically.

Figure 2:
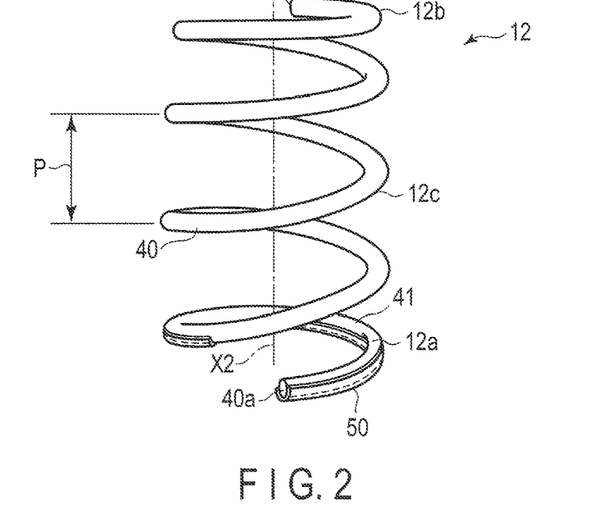
FIG. 2 is a perspective view of the coil spring of the suspension mechanism shown in FIG. 1.

FIG. 2 shows the state in which no compressive load is applied to the coil spring 12 (i.e., the so-called free state). In this specification, the length of the coil spring 12 in the direction of central axis X2 in the free state is referred to as a free length. When a compressive load is applied to the coil spring 12 along central axis X2, the coil spring 12 is deformed in the direction of making its length shorter than the free length. The coil spring 12 is mounted on the vehicle body 10 in an assembly state in which it is compressed between the lower spring seat 13 and the upper spring seat 14.

The coil spring 12 shown in FIG. 2 comprises a wire (element wire) 40 formed into a helical shape. The wire 40 is formed of spring steel having a circular cross-section. On the entire outer surface of the wire 40, a coating film 41 for rust prevention is formed. The coil spring 12 comprises a lower end turn portion 12a, an upper end turn portion 12b, and an effective portion 12c. The lower end turn portion 12a is formed in a part that is less than one turn, for example, from a lower end 40a of the wire 40. The upper end turn portion 12b is formed in a part that is less than one turn, for example, from an upper end 40b of the wire 40. The effective portion 12c is wound at pitch P between the lower end turn portion 12a and the upper end turn portion 12b. An example of the coil spring 12 is a cylindrical coil spring. However, depending on the specification of a vehicle, various forms of compression coil springs, such as a barrel-shaped coil spring, an hourglass coil spring, a tapered coil spring, a variable pitch coil spring, and the other springs, may be adopted.

The coil spring 12 is fitted in the vehicle body 10 in a state in which it is compressed between the lower spring seat 13 and the upper spring seat 14. Further, the coil spring 12 elastically supports the weight of the vehicle body 10 applied from above. The lower end turn portion 12a contacts an upper surface of the spring seat 13. The upper end turn portion 12b contacts a lower surface of the spring seat 14. The coil spring 12 extends to the maximum at the time of a full rebound. "Full rebound" refers to a state where the coil spring 12 is extended to the maximum by a load applied to the coil spring 12 downwardly when the vehicle body is lifted. Also, the coil spring 12 is compressed to the maximum at the time of a full bump. "Full bump" refers to a state of having the maximum compression in the coil spring 12 when a load applied from the upper side of the coil spring 12 is large.

Figure 3:
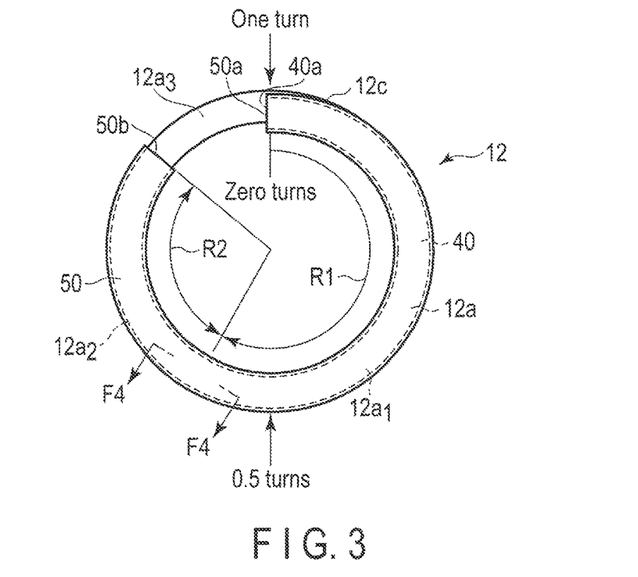
FIG. 3 is a bottom view of an end turn portion of the coil spring shown in FIG. 2.

FIG. 3 is a bottom view of the lower end turn portion 12a of the coil spring 12. The end turn portion 12a comprises a first portion $12a_1$ in a range shown by arrow R1, a second portion $12a_2$ in a range shown by arrow R2, and a third portion $12a_3$, in a direction in which the wire 40 is wound. The first portion $12a_1$ is a portion where it is always in contact with the spring seat 13 irrespective of a load applied to the coil spring 12. The second portion $12a_2$ is a portion where it contacts the spring seat 13 or is separated from the same depending on the load. The third portion $12a_3$ is a portion where it is always separated from the spring seat 13 irrespective of the load.

The first portion $12a_1$ ranges from the lower end 40a of the wire 40 (i.e., zero turns) to a point exceeding 0.5 turns, for example. For instance, the first portion $12a_1$ extends from zero turns to a point around 0.6 turns. The first portion $12a_1$ is always in contact with the spring seat 13 irrespective of a load applied to the coil spring 12. However, the first portion $12a_1$ may be a part that is less than 0.5 turns from the lower end 40a of the wire 40. Alternatively, the first portion $12a_1$ may be started from a point slightly separated from the lower end 40a (for example, around 0.1 turns).

The second portion $12a_2$ extends from an end portion of the first portion $12a_1$ to a point that is less than one turn. For instance, the second port ion $12a_2$ extends from a point around 0.6 turns to a point around 0.9 turns. The second portion $12a_2$ contacts the spring seat 13 or is separated from the same when the coil spring 12 is deformed between full rebound and full bump. That is, the second portion $12a_2$ is separated from the spring seat 13 when a load is small, and is in contact with the spring seat 13 when the load is large. The third portion $12a_3$ is always separated from the spring seat 13 irrespective of the magnitude of the load.

Figure 4:
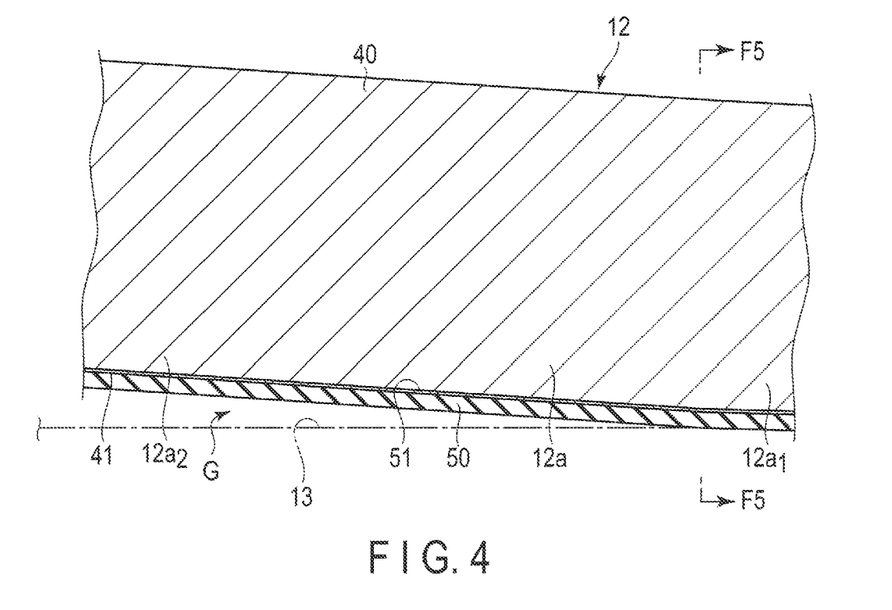
FIG. 4 is a cross-sectional view of the coil spring taken along line F4-F4 of FIG. 3.
Figure 5:
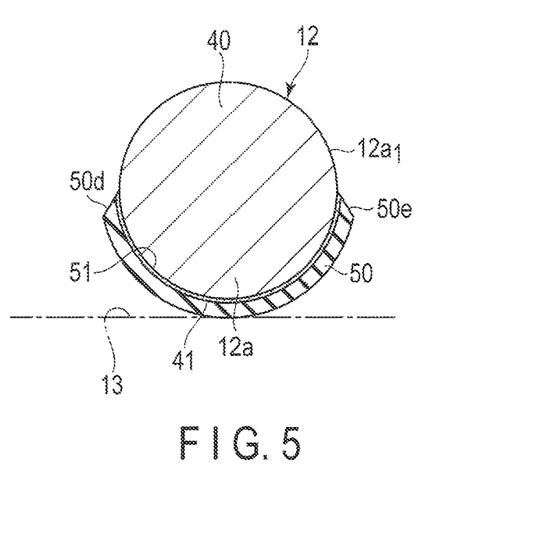
FIG. 5 is a cross-sectional view of the coil spring taken along line F5-F5 of FIG. 4.

On a lower surface of the wire 40 at the lower end turn portion 12a, an insulating sheet 50 is attached. The insulating sheet 50 is made of a material having rubber elasticity. The insulating sheet 50 is fixed to the wire 40 via an adhesion layer 51 (FIGS. 4 and 5). The adhesion layer 51 is formed on the coating film 41. A material of the insulating sheet 50 may be natural rubber or synthetic rubber selected from the group consisting of butadiene rubber, styrene-butadiene rubber, isoprene rubber, chloroprene rubber, nitrile rubber, and urethane rubber, or a synthetic resin having elasticity such as urethane elastomer. The adhesion layer 51 may be a vulcanized adhesive, or an acrylic structural adhesive, for example.

The insulating sheet 50 is formed in a region including at least the second portion $12a_2$ of the end turn portion 12a. Moreover, the insulating sheet 50 is fixed onto the coating film 41 having rust-inhibiting coating which covers the outer surface of the wire 40 via the adhesion layer 51. For example, the insulating sheet 50 shown in FIG. 3 is formed in a region extending over both the first portion $12a_1$ and the second portion $12a_2$. In this case, one end 50a of the insulating sheet 50 is located at substantially the same position as the lower end 40a of the wire 40. The other end 50b of the insulating sheet 50 extends toward the third portion $12a_3$.

FIG. 4 illustrates a part around a border portion between the first portion $12a_1$ and the second portion $12a_2$. FIG. 5 is a cross-sectional view of the first portion $12a_1$ in a radial direction of the wire 40. In the first portion $12a_1$, a lower surface of the insulating sheet 50 is in contact with the spring seat 13. In the second portion $12a_2$, a gap G (FIG. 4) is formed between the lower surface of the insulating sheet 50 and the spring seat 13. This gap G is gradually reduced as the load applied to the coil spring 12 is increased. When the load exceeds a predetermined value, the gap G becomes zero, and the insulating sheet 50 contacts the spring seat 13. As shown in FIG. 5, both side edges 50d and 50e Of the insulating sheet 50 are shaped to extend vertically so that foreign matter such as sand and dust does not accumulate.

Note that an insulating sheet 50 similar to the one provided in the lower end turn portion 12a can also be provided in the upper end turn portion 12b. However, the likelihood of having the foreign matter such as sand and dust stuck between the upper end turn portion 12b and the spring seat 14 is small. Accordingly, in order to reduce the weight of a vehicle, it is better to provide the insulating sheet 50 only at the lower end turn portion 12a.

As the coil spring 12 is compressed between the spring seats 13 and 14, a preload is applied. While this preload is being applied, the coil spring 12 is fitted on the shock absorber 15, and is further mounted on the vehicle body 10. A vertical load is applied to the coil spring 12 mounted on the vehicle body 10. The coil spring 12 is deformed between the lower spring seat 13 and the upper spring seat 14 in accordance with the magnitude of the load. That is, the coil spring 12 extends and retracts between a full bump (the maximum compression state) and a full rebound (the maximum expansion state) in accordance with the magnitude of the load.

When the coil spring 12 extends, a gap between the spring seat 13 and the second portion $12a_2$ is increased. There is also a possibility that foreign matter such as sand will enter into this gap. In contrast, when the coil spring 12 is compressed, a gap between the spring seat 13 and the second portion $12a_2$ is reduced. Accordingly, if hard foreign matter such as sand is trapped, between the end turn portion 12a and the wire 40, coating of the coil spring 12 will detach or the wire 40 will be damaged. Peeling of the coating or damage to the wire 40 causes the wire 40 to corrode.

In the present embodiment, the insulating sheet 50 is bonded to the lower surface of the wire 40 in at least the second portion $12a_2$ of the end turn portion 12a with the coating film 41 interposed therebetween. Accordingly, even if sand or foreign matter is trapped between the spring seat 13 and the wire 40, in the coil spring 12 of the present embodiment, corrosion of the wire 40 can be suppressed. Thus, the coil spring 12 of the present embodiment can prevent the wire 40 from breaking by the corrosion, and improve the durability. Since the insulating sheet 50 is bonded to the wire 40, even if foreign matter, such as sand, or water intrudes onto the spring seat 13, there is no fear of such foreign matter or water proceeding between the wire 40 and the insulating sheet 50. Consequently, a disadvantageous effect on the durability brought about by contact between a lower surface of the end turn portion 12a and the foreign matter or water can be avoided.

With respect to the coil spring 12 of the present embodiment, the wire 40 and the insulating sheet 50 are bonded to each other and integrated into a single component. Accordingly, as compared to a conventional product in which a block insulator which is a component different from the coil spring is arranged on a spring seat, the number of suspension components can be reduced. Accordingly, it becomes easy to handle the suspension components in assembling the suspension mechanism 11, and component management and mounting of the coil spring on a vehicle axe also facilitated.

Figure 6:
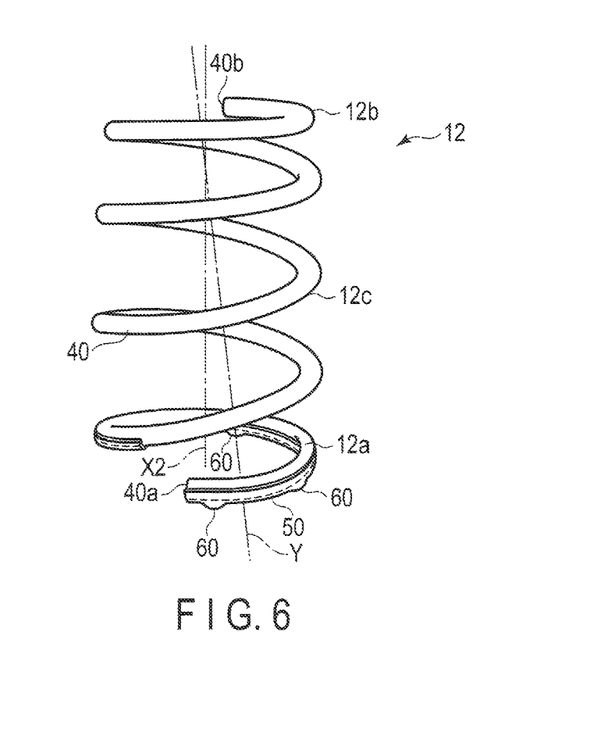
FIG. 6 is a perspective view of a coil spring according to a second embodiment.
Figure 7:
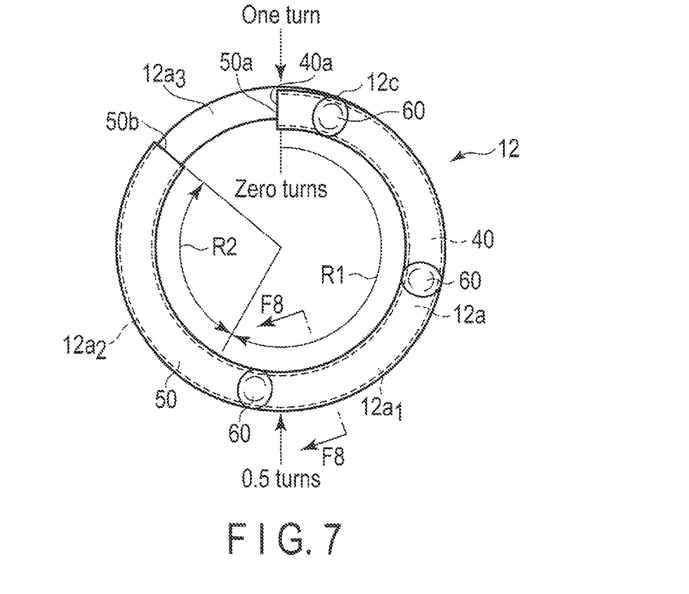
FIG. 7 is a bottom view of an end turn portion of the coil spring shown in FIG. 6.
Figure 8:
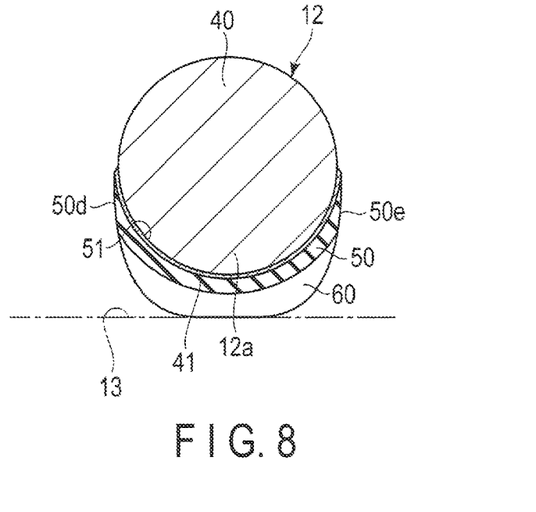
FIG. 8 is a cross-sectional view of the coil spring taken along line F8-F8 of FIG. 7.

FIGS. 6 and 8 each show an end turn portion 12a of a coil spring 12 comprising an insulating sheet 50 according to a second embodiment. As shown in FIGS. 7 and 8, a convex portion 60 which protrudes toward a spring seat 13 is formed in one place or more on a lower surface of the insulating sheet 50. This convex portion 60 is formed in at least one place (for example, three places) in a winding direction of the end turn portion 12a. By compressing the coil spring 12 in a state where a lower surface of the convex portion 60 contacts the spring seat 13, as shown in FIG. 8, a force line position Y (FIG. 6) can be shifted from a central axis X2 of the coil spring 12. Also, in accordance with the position of the convex portion 60 and the number of convex portions 60, the force line position Y can be adjusted as needed. Since the other structures and operations are common to those of the coil spring 12 of the first embodiment, common reference numbers are assigned to parts having commonalities with the first embodiment, and explanation of such parts will be omitted.

Figure 9:
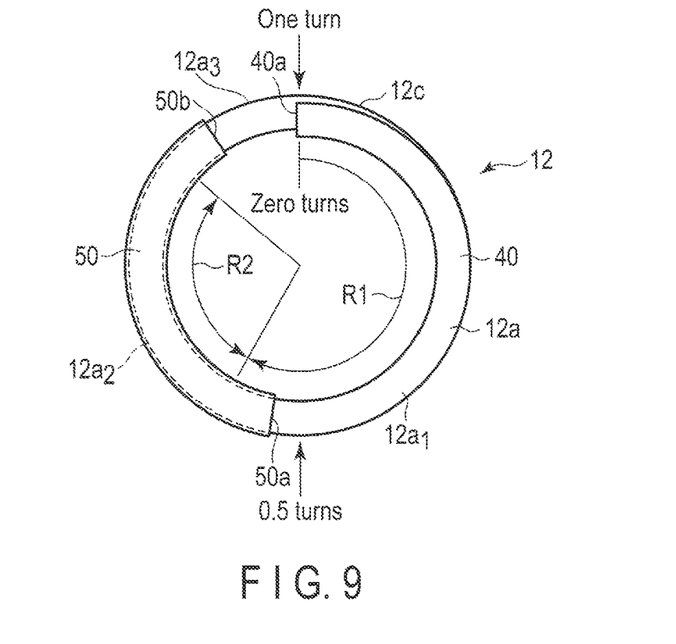
FIG. 9 is a bottom view of an end turn portion of a coil spring according to a third embodiment.

FIG. 9 shows an end turn portion 12a of a coil spring 12 comprising an insulating sheet 50 according to a third embodiment. The insulating sheet 50 shown in FIG. 3 is bonded at an extent of the entire length of a second portion $12a_2$, and a part of a first portion $12a_1$ and a part of a third portion $12a_3$ which are connected to both sides of the second portion $12a_2$, respectively. Accordingly, one end 50a of the insulating sheet 50 is located at the first portion $12a_1$. The other end 50b of the insulating sheet 50 is located at the third portion $12a_3$. Since the other structures and operations are common to those of the coil spring 12 of the first embodiment, common reference numbers are assigned to parts having commonalities with the first embodiment, and explanation of such parts will be omitted.

Figure 10:
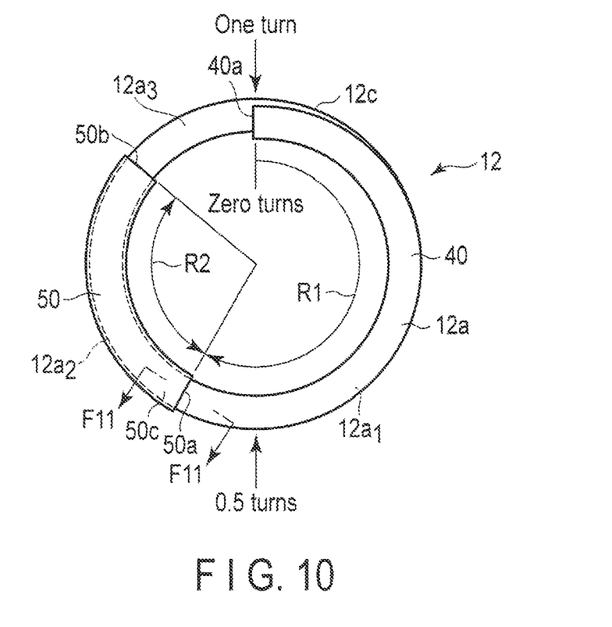
FIG. 10 is a bottom view of an end turn portion of a coil spring according to a fourth embodiment.
Figure 11:
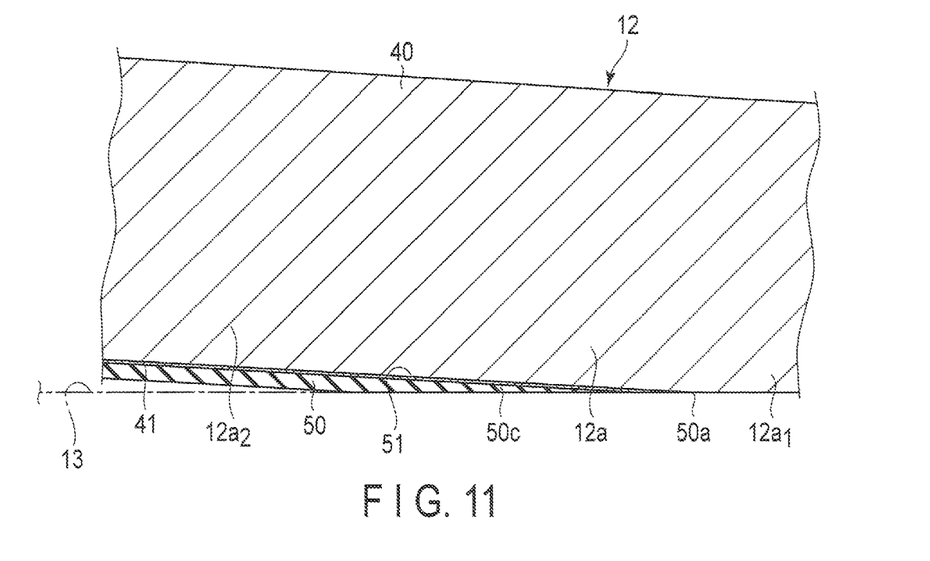
FIG. 11 is a cross-sectional view of the coil spring taken along line F11-F11 of FIG. 10.

FIGS. 10 and 11 each show an end turn portion 12a of a coil spring 12 comprising an insulating sheet 50 according to a fourth embodiment. The insulating sheet 50 shown in FIG. 10 is provided in substantially only a second portion 12a. Further, as shown in FIG. 11, a taper portion 50c is formed at an end portion of the insulating sheet 50. The taper portion 50c has its thickness reduced toward a first portion $12a_1$ from the second portion $12a_2$. Because the taper portion 50c is provided, a gap between the end turn portion 12a and a spring seat 13 is prevented from being formed at the end portion of the insulating sheet 50. Since the other structures and operations are common to those of the coil spring 12 of the first embodiment, common reference numbers are assigned to parts having commonalities with the first embodiment, and explanation of such parts will be omitted.

Figure 12:
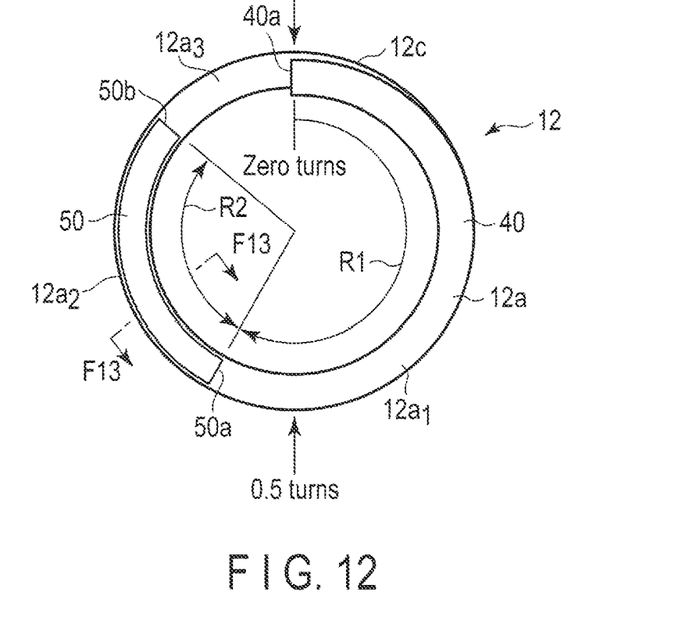
FIG. 12 is a bottom view of an end turn portion of a coil spring according to a fifth embodiment.
Figure 13:
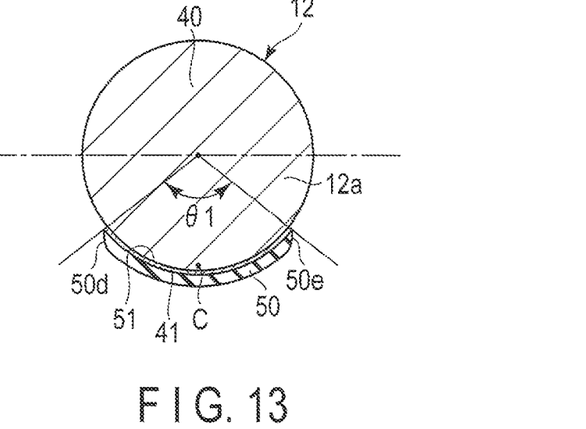
FIG. 13 is a cross-sectional view of the coil spring taken along line F13-F13 of FIG. 12.

FIGS. 12 and 13 each show an end turn portion 12a of a coil spring 12 comprising an insulating sheet 50 according to a fifth embodiment. The insulating sheet 50 of the present embodiment is bonded in a narrow angular range θ1 of less than 180°, which is defined in a lower half portion of a wire 40 in the end turn portion 12a with a point C being the center thereof, as shown in FIG. 13. Also, both side edges 50d and 50e of the insulating sheet 50 are shaped to extend in a substantially vertical direction so that foreign matter such as sand and dust does not accumulate. Since the other structures and operations are common to those of the coil spring 12 of the first embodiment, common reference numbers are assigned to parts having commonalities with the first embodiment, and explanation of such parts will be omitted.

The present invention can be applied to a suspension mechanism of a vehicle other than cars. Needless to say, in carrying out the present invention, in addition to the specific shape and dimension, the number of turns, the material, and the spring constant of the wire of the coil spring, the shape, dimension, arrangement and the like of the wire and the insulating sheet which constitute the coil spring may be modified variously.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension coil spring comprising:
   a lower end turn portion formed at a lower end of a wire which is helically wound; and
   an upper end turn portion formed at an upper end of the wire,
   wherein:
   the lower end turn portion comprises a first portion which is configured to always be in contact with a lower spring seat irrespective of a magnitude of a load, a second portion which is configured to contact the lower spring seat or be separated from the lower spring seat in accordance with the magnitude of the load, and a third portion which is configured to always be separated from the lower spring seat irrespective of the magnitude of the load;
   at least the second portion of the lower end turn portion is provided with an insulating sheet which is made of an elastomeric material and is attached to a lower surface of the wire by adhesive bonding, the insulating sheet covering the lower surface of the wire in the second portion of the lower end turn portion, and the insulating sheet not covering an upper surface of the wire;
   the suspension coil spring further comprises a coating film formed on an outer surface of the wire, and an adhesive layer provided between the coating film and the insulating sheet;
   at the second portion of the lower end turn portion, a lower surface of the insulating sheet is arranged to contact the lower spring seat or be separated from the lower spring seat in accordance with the magnitude of the load; and
   both side edges of the insulating sheet are inclined downwardly from the wire, and are configured to prevent foreign matter from accumulating.

2. The suspension coil spring of claim 1, wherein the insulating sheet is provided in the first portion and the second portion.

3. The suspension coil spring of claim 1, wherein a convex portion which protrudes toward the lower spring seat is formed on the lower surface of the insulating sheet in at least one place in a winding direction of the end turn portion.

4. The suspension coil spring of claim 2, wherein a convex portion which protrudes toward the lower spring seat is formed on the lower surface of the insulating sheet in at least one place in a winding direction of the end turn portion.

5. The suspension coil spring of claim 1, wherein the insulating sheet is provided in only the second portion.

6. The suspension coil spring of claim 1, wherein the insulating sheet is provided in the second portion, a part of the first portion which is connected to the second portion, and a part of the third portion which is connected to the second portion.

7. The suspension coil spring of claim 2, wherein the insulating sheet is provided in the second portion, a part of the first portion which is connected to the second portion, and a part of the third portion which is connected to the second portion.

8. The suspension coil spring of claim 1, wherein a taper portion whose thickness is reduced toward the first portion from the second portion is formed at an end portion of the insulating sheet.

9. The suspension coil spring of claim 2, wherein a taper portion whose thickness is reduced toward the first portion from the second portion is formed at an end portion of the insulating sheet.

* * * * *